United States Patent

[11] 3,618,042

[72] Inventors Ryoji Miki;
Hiroshi Morita; Toshihiko Odaka, all of Hatano-shi, Japan
[21] Appl. No. 872,285
[22] Filed Oct. 29, 1969
[45] Patented Nov. 2, 1971
[73] Assignee Hitachi, Ltd.
Tokyo, Japan
[32] Priority Nov. 1, 1968
[33] Japan
[31] 43/79324

[54] ERROR DETECTION AND INSTRUCTION REEXECUTION DEVICE IN A DATA-PROCESSING APPARATUS
8 Claims, 3 Drawing Figs.

[52] U.S. Cl. ........ 340/172.5
[51] Int. Cl. ........ G06f 11/00, G06f 11/10
[50] Field of Search ........ 340/172.5; 235/157

[56] References Cited
UNITED STATES PATENTS

| | | | |
|---|---|---|---|
| 3,311,890 | 3/1967 | Waaben | 340/172.5 |
| 3,328,766 | 6/1967 | Burns et al. | 340/172.5 |
| 3,336,579 | 8/1967 | Heymann | 340/172.5 |
| 3,343,141 | 9/1967 | Hackl | 340/172.5 |
| 3,403,377 | 9/1968 | Connolly et al. | 340/172.5 |

*Primary Examiner*—Gareth D. Shaw
*Attorney*—Craig, Antonelli, Stewart & Hill

ABSTRACT: In a data-processing apparatus, the data-processing speed is remarkably reduced if the system is stopped from operation every time error operation occurs. This specification discloses a data-processing apparatus wherein when execution of an instruction is effected by means of several stages sequentially controlled, a register adapted for indicating whether the reexecution should be effected for each instruction when error operation occurs, whether the reexecution should be effected for each stage and whether the reexecution is impossible is successively set so that when error operation occurs, the reexecution sequence is started in accordance with the command of said register.

INVENTORS

RYOJI MEKI, HIROSHI MORITA and

TOSHIHIKO ODAKA

BY

Craig, Antonelli, Stewart & Hill

ATTORNEYS

INVENTORS

RYOJI MIKI, HIROSHI MORITA and

TOSHIHIKO ODAKA

BY Craig, Antonelli, Stewart & Hill

ATTORNEYS

ERROR DETECTION AND INSTRUCTION REEXECUTION DEVICE IN A DATA-PROCESSING APPARATUS

BACKGROUND OF THE INVENTION

1. Field of the Invention

This invention relates to a control mechanism for data-processing apparatus, and more particularly it pertains to a data-processing apparatus which is adapted to achieve a reexecuting function when error operation occurs during the processing operation.

2. Description of the Prior Art

The speed at which data is processed in data-processing system has been greatly improved by advanced processing techniques and elements. However, as the processing function becomes more complicated, the possibility of error operation is increased. Therefore, it is required that design be made by taking into consideration such error operation.

Various countermeasures against such error operation are conceivable at various technical levels. In most cases, it has heretofore been the usual practice that error operation is treated in accordance with a program. However, such a simple countermeasure against error operation as that of effecting reexecution of a program has been insufficient as the functions of data-processing systems are improved. Thus, an automatic reexecuting function of hardware has become essential.

As the number of elements remarkably increases as a result of improvements in the function and speed of processing apparatus, the number of types of error operation also increases. Above all, there is the tendency that the majority of error operations turn out to be accidental ones. Obviously, the data processing speed is remarkably reduced if the system is stopped from operation each time such accidental error operation occurs.

SUMMARY OF THE INVENTION

It is a primary object of the present invention to provide the operation processing mechanism of a processing apparatus with a function to automatically reexecute the operation when accidental error operation occurs, thereby guaranteeing the operational content.

Another object of the present invention is to realize an economical operation reexecuting device in a conventional microprogram type processing apparatus.

DESCRIPTION OF THE PREFERRED EMBODIMENTS

Figure 1:
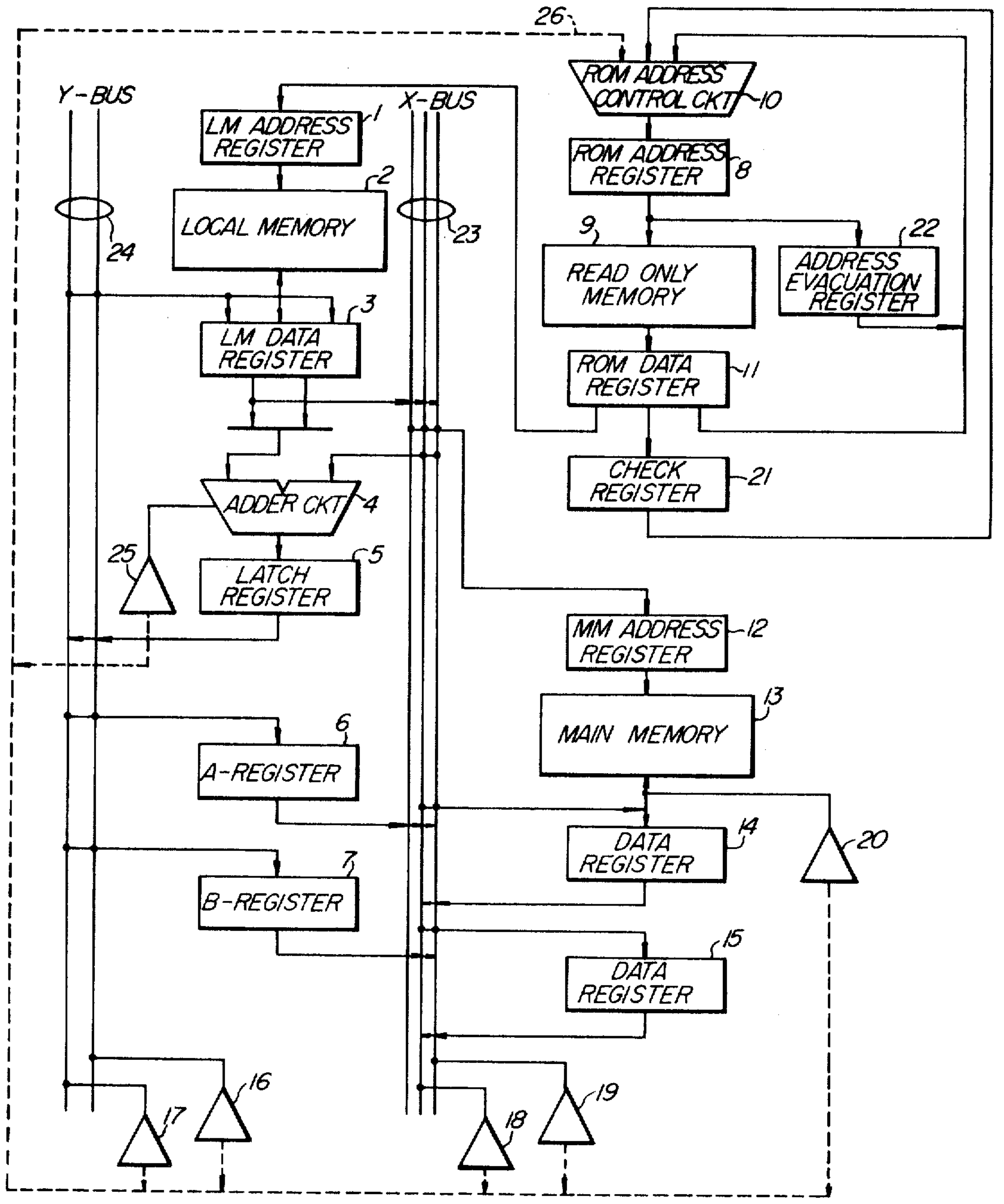
FIG. 1 is a block diagram showing the internal arrangement of processing apparatus useful for explaining the present invention.

Referring to FIG. 1 the processing apparatus comprises a read only memory 9 for sequential control, main memory (MM) 13, local memory (LM) 2 used for temporary storage of data, and adder circuit 4.

A memory address register 8 is connected with the read only memory 9, and a microprogram is read out of a data register 11 at an address appointed by the memory address register 8 at a data register 11. The data register 11 is connected with a read only memory (ROM) address control circuit 10 directly and through a check register 21. Further, the data register 11 is also connected with memory address register 1 of the local memory 2. Data will be read out of the local memory 2 at an address appointed by the local memory address register and then transferred to a local memory data register 3. The data register 3 is connected with a Y-bus 24 and X-bus 23 and further with the adder circuit 4 as one of the inputs thereof. The output of the adder circuit 4 is connected with the Y-bus 24 through a latch register 5. A and B-registers 6 and 7 are connected between the X and Y-buses 23 and 24. The memory address register 12 of the main memory 13 is connected with the X-bus 23 so that data is read out of the main memory 13 into the data register 14. The data register 14 is connected with the X-bus 23, and a data register 15 is similarly connected with the X-bus 23. Each of these data registers 14 and 15 is adapted to store therein data corresponding to half word length.

Parity check circuits 20, 18, 19, 16, 17 and 25 are connected with the main memory 13, X-bus 23, Y-bus 24 and adder circuit 4, and their outputs are connected with the (ROM) address control circuit 10 through a line 26. Thus, reexecution is performed when any error is found.

Operational execution is carried out as follows: A microprogram is read out of the read only memory 9 by the read only memory address register 8 so as to be stored in the data register 11. Then, the microprogram thus stored in the data register 11 is decoded to thereby control the flow of the data being processed during one machine cycle.

Now, consider the microprogram-sequence for the instruction to add one word of the content of a general register GR incorporated in the local memory 2 and one word of the content of the main memory and set the result of the addition in the general register.

First, the content of a program counter PC incorporated in the local memory 2 is read out which is in turn set in the memory address register 12 through the local memory data register 3 and X-bus 23, thus effecting read-out from the main memory 13. At this point, the content of the program counter PC has "+2" added thereto and then returned to the program counter PC. The original content of the program counter PC is stored in an old program counter OPC incorporated in the local memory 2. This is expressed as follows:

PC ⟶ OPC, MAR ; MREAD

This means that the content of the program counter PC is transferred to the old program counter OPC and memory address register 12 (MAR) so that data is read out of the main memory and transferred to the data register 14 (MREAD).

Upon completion of the read-out at the memory 13, an instruction word is decoded in the next cycle to make judgment as to what should be executed. In this case, since the contents of the general register GR and memory are added to each other, the instruction word is branched to a micro instruction for forming the effective address of the memory 13. If it is assumed that the instruction has one word length and that the memory depth has half word length, then it is necessary to again read the latter half of the instruction.

PC ⟶ MAR ; MREAD

The former half of the instruction is stored in the data register 15, and the latter half thereof in the data register 14. The effective address is constituted by the sum of the content of a base register BR incorporated in the local memory 2 and displacement address which is present in the data register 14. The addition is effected between the data register 3 of the local memory 2 and the date register 14 through the bus 23, and the result of the addition is set in the latch register through the adder circuit 4 and thereafter set in the A-register 6.

BR + MR ⟶ A

In the next cycle, the effective address is set in the memory address register 12 to read an operand out of the memory 13.

A ⟶ MAR ; MREAD

The reading operation with respect to the memory 13 is started with the lower half word of one word of the operand, and the result is set in the data register 14.

In the subsequent cycle, the content (to be operated) of the general register GR present in the local memory 2 is prepared in the local memory data register 14, so that the lower half word of the content and the content of the data register 14 are added to each other. The result is set in the B-register 7.

GR + MR ⟶ B

Further, the above is also effected with respect to the upper half word, and the result is set in the A-register 6.

A ⟶ MAR ; MREAD

GR + MR ⟶ A

In the last cycle, the contents of the A-register 6 and B-register 7 are transferred to the local memory 2.

A, B ⟶ GR

In the case where execution sequence is controlled by the foregoing well-known microprogram technique, error operation is checked in the respective cycles.

In FIG. 1, numeral 20 represents a parity check circuit for data read out of the memory 13, and 19, 18, 16 and 17 parity check circuits for data on the data transferring buses 23 and 24. Numeral 25 indicates an error operation checking circuit of the adder circuit 4. In the process of operational execution, when any error operation is checked by these check circuits, the occurrence of the error operation is informed to the ROM address control circuit 10 through a signal line 26.

In order to effect reexecution when error operation has been checked, the micro program sequence which is presently being executed may be again executed from the beginning only if information in the memory is not destroyed. However, it is sometimes the case that only the machine cycle may be reexecuted without effecting the execution of the micro program sequence from the beginning. Furthermore, the situation may occur that the operational result cannot be guaranteed even if reexecution is effected.

The primary feature of the present invention resides in the function to automatically effect discrimination as to whether the instruction executing sequence should be reexecuted from the beginning thereof or whether only the micro instruction of the machine cycle may be reexecuted or whether the correctness of the operational result can be guaranteed even if reexecution is effected, and make proper treatment according to each of such situations.

Figure 2:
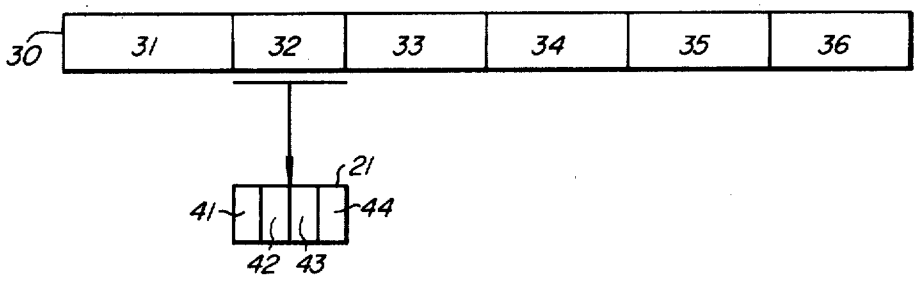
FIG. 2 is a view showing a form of microprogram for controlling the operation of the processing apparatus.

FIG. 2 shows the form of the micro instruction 30. One micro instruction consists of a function field 31, check field 32, X-bus field 33, Y-bus field 34, test field 35 and branch field 36. The check field 32 is composed of four bits, and it is set in the check register 21 after the micro instruction has been set in the data register 11.

In the check field composed of four bits for the micro instruction, information is set for reexecuting the operation in case error operation occurs during the execution of the above-mentioned micro instruction. The information is different depending upon the execution contents of each micro instruction. If data to be subjected to the execution of the micro instruction is not destroyed by the operation, the operational result can be guaranteed solely by reexecuting only the micro instruction. Accordingly, a third bit is set to "1" in the check field for the micro instruction. In case the data to be subjected to execution of the micro instruction is destroyed by the operation, but data is not destroyed under the execution of a preceding micro instruction in the instruction executing sequence, the operational result can be guaranteed by repeating the sequence of the instruction execution from the beginning. In such a case, a second bit is set equal to "1" in the check field of the micro instruction.

In case the operational result cannot be guaranteed even if reexecution is effected, the first bit of the check field for the micro instruction is set equal to "1."

These bits of the check field are set in the check register 21 during each machine cycle. The check register 21 is connected to the address control circuit 10 to place the latter in an operation mode to be reexecuted when an error operation has been detected; in other words, whether or not the instruction execution sequence should be reexecuted or only the machine cycle should be executed at that time.

In case any error operation is detected when the first bit 41 of the check register 21 is "1," then it is shown that it is no longer possible to guarantee the result by reexecuting the instruction. In case the first bit 41 is "0," second bit 42 is "1" and third bit is "0," then it is shown that it is possible to guarantee the result of reexecution by repeating the sequence of the instruction execution from the beginning thereof. In case the first bit 41 is "0" and the third bit is "1," it is shown that only the machine cycle may be executed irrespective of the value of the second bit. In case the fourth bit 44 is "1," it is shown that the present instruction execution sequence is being reexecuted, and at this point, if error operation is again detected, then it is regarded that the error operation is not accidentally caused so that no correct result can be obtained by reexecuting the operation.

Figure 3:
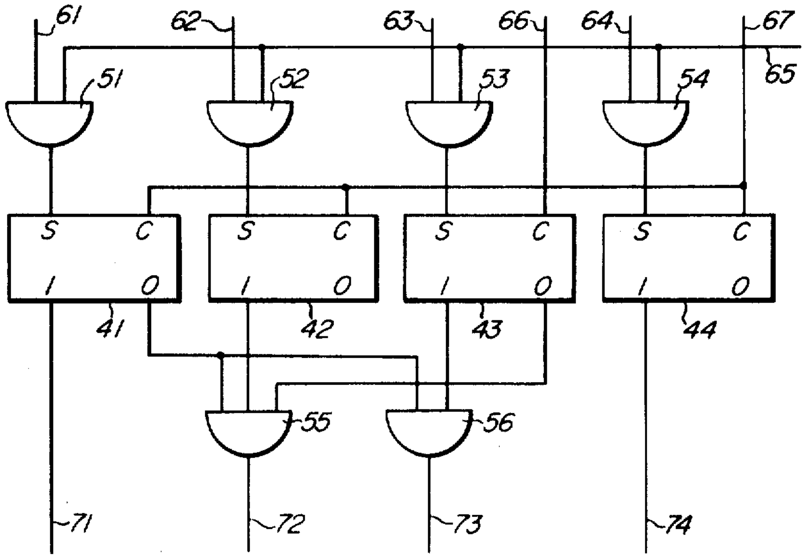
FIG. 3 is a view showing the arrangement of a check register constituting the feature of the present invention.

FIG. 3 shows in greater detail the arrangement of the check register, wherein flip-flops 41, 42, 43 and 44 correspond to the first, second, third and fourth bits of the check register respectively.

Four bits of the check field are taken out of the data register 11 through signal lines 61, 62, 63 and 64 respectively so as to be passed to input gates 51, 52, 53 and 54 of the check register respectively. A signal line 65 which constitutes one of the inputs of each of these gates is a timing signal line, which is energized once in each machine cycle after the content of the data register 14 has been established. Thus, the content of the check field is set in the check register every time. On the other hand, signal line 66 is energized once at the end of each machine cycle so as to clear the content of the third bit 43. Signal line 67 is energized in the final machine cycle of the execution sequence of one instruction so as to clear the first bit 41, second bit 42 and fourth bit 44.

Gates 55 and 56 are so designed as to establish a condition for reexecution. Signal line 71 extends directly from the output of the first bit 41 to the input of the ROM address control circuit 10 of the read only memory 9. When the signal line 71 is energized, no reexecution can be effected even if error operation is detected, and, therefore, the ROM address control circuit 10 does not perform reexecution but causes an interruption to inform the program of the error operation. Signal line 72 is energized when the first bit is "0," second bit is "1" and third bit is "0," thus indicating that the reexecution of the instruction unit is possible. If error operation is detected when the signal line 73 is energized, then the ROM address control circuit 10 operates to set the head address of the instruction reexecution micro program routine in the memory address register 8. The signal line 73 is energized when the first bit is "0" and the third bit is "1," so that it is shown that reexecution of the micro program unit is possible. If error operation is detected when the signal line 73 is energized, then an address is taken out of an address evacuation register 22 by the ROM address control circuit 10 and again set in the address register 8. The signal line 74 indicates that reexecution is being effected when the fourth bit is taken out as it is and the signal line is energized. Operational reexecution is tried eight times for example, and the resulting signal is applied as an input to a three-bit counter which is adapted to count the number of times that reexecution is performed.

The content of the check register is controlled in accordance with a value previously fixed in the check field in the formation of the microprogram, and upon detection of any error operation, a new microprogram routine is automatically branched in accordance with the content of this register so that the respective treatments are performed. An example will be given below.

The relationship between the microprogram-sequence and the check register when the instruction for addition is executed is as follows:

| Micro instruction | Check field | Check register |
|---|---|---|
| (1) PC ⟶ OPC, MAR; MREAD | 0100 | 0100 |
| (2) PC ⟶ MAR; MREAD | 0100 | 0100 |
| (3) BR+MR ⟶ A | 0010 | 0110 |
| (4) A ⟶ MAR; MREAD | 0010 | 0110 |
| (5) GR+MR ⟶ B | 0010 | 0110 |
| (6) A ⟶ MAR; MREAD | 0010 | 0110 |
| (7) GR+MR ⟶ A | 0010 | 0110 |
| (8) A, B ⟶ GR | 1000 | 1100 |

In case an error occurs during execution of the cycle 1 or 2, the original content of the program counter PC is taken out of the old program counter OPC on the basis of the fact that the decoding of the instruction is not yet finished and the fact that the content of the check register 21 is "0100," and then it is set in the program counter PC so that the execution is newly effected.

In case an error occurs in the cycles 3, 4, 5, 6, and 7, the respective cycles are repeated. In case an error occurs in the last cycle, there is the possibility that the content (to be operated) of the general register GR has already been destroyed, and therefore reexecution is impossible. In this case, the first bit is "1,"

Such a system for reexecuting the processes is applicable not only to data-processing apparatus for microprogram control but also to data processing apparatus which is designed so as to effect data processing by means of sequential control. More specifically, when execution of an instruction is done at several stage sequentially controlled, a register having a bit for indicating whether the reexecution should be done for each instruction when error operation occurs in each stage, whether the reexecution should be done for each stage or whether the reexecution is impossible is successively set, and upon occurrence of error operation, the sequence of the reexecution can be started in accordance with the content of the register.

In the above-mentioned description, the reexecution when an error operation occurs comprises three cases, that is, one to be done for each instruction, one to be done for each processing stage and an impossible case. However, there happens a case wherein the reexecution for the stage where an error operation has been detected cannot assure a proper result, but the reexecution after a certain stage will assure a proper result without any need of a reexecution for the instruction. Then, this invention may further provide for the following case. An instruction is composed of several stages, so, if there is provided a stage to be a checkpoint which assures a proper result by a reexecution after a certain stage of the stages involved as mentioned above, instead of the reexecution for each instruction or each stage, a reexecution of a series of stages may serve the purpose returning to the stage to be a checkpoint. In the present case, an instruction is actually composed of eight stages. Accordingly, the third stage is one to be a checkpoint. Then, if an error operation has been found at the fifth stage, a reexecution of a series of stages, the fourth and the fifth may be performed returning to the fourth stage. Suppose now that the fifth stage is the one considered to be a checkpoint, then if an error operation has been found at the seventh stage, reexecution of a series of stages, the sixth and the seventh may be carried out by returning to the sixth stage. Thus, addition of the reexecution performance as mentioned above can bring a more effective data processing.

We claim:

1. A data-processing apparatus for effecting data processing using sequentially controlled processing stages comprising:

an addressable memory storing words including information processed in said processing stages and information of a check field representing whether the reexecution should be done for each instruction, circuits connected with said memory for executing processing in accordance with contents stored in said memory, error operation detecting means provided in said circuits for detecting an error operation therein and producing an error signal;

a check register connected to said memory to set therein contents of the check field in the words, said register being adapted to provide a signal representing whether the reexecution should be done for each instruction, whether the reexecution should be done for each processing stage or whether the reexecution is impossible, for occurrence of an error operation, and an address control circuit connected with said check register and said detecting means to provide a signal representing the address of words in said memory corresponding to a processing stage in accordance with the signal provided from said check register upon reception of said error signal and to supply it to said memory.

2. The data-processing apparatus according to claim 1, in which said check register has the function representing whether the reexecution should be done for a series of processing stages upon the occurrence of the error operation.

3. The data processing apparatus according to claim 1, in which said check register comprises:

first, second and third flip-flops adapted successively to be set by the contents of check field of said words every processing stage and to be reset at the last processing stage of one instruction executing sequence, the set outputs of said first and third flip-flop representing that the reexecution is impossible and that the reexecution is being effected, respectively, a fourth flip-flop adapted to be set by the contents of check field of said words every processing stage and to be reset at the termination of the respective processing stages, a first transfer means to transfer the set output of said first flip-flop to said address control circuit, a first AND gate receiving reset outputs of said first and fourth flip-flop and providing at its output side a signal representing a command of the reexecution for each instruction, a second transfer means to transfer the output signal of said first AND gate to said address control circuit, a second AND gate receiving at its input side the reset output of said first flip-flop and a set output of said fourth flip-flop and providing at its output side an output signal representing a command of the reexecution for each processing stage, a third transfer means to transfer said output signal produced from said second AND gate to said address control circuit, and a fourth transfer means to transfer said set output of the third flip-flop to said address control circuit 4. The data-processing apparatus according to claim 1, further comprising an address evacuation register connected to said address control circuit for evacuating an address signal generated by said address control circuit which will be to the address of said memory and providing it to said address control circuit upon the reexecution.

5. A data-processing apparatus for effecting execution of instructions using a plurality of micro instructions sequentially controlled comprising:

an addressable read only memory storing the micro instructions including at least function field representing processed contents and check field representing information for reexecution, a check register adapted to be set by the contents of check field in said micro instruction, said check register providing a signal representing whether the reexecution should be done for each instruction, whether the reexecution should be done only for micro instructions under error operation, or whether the reexecution is impossible, for occurrence of an error operation, and an address control circuit adapted to represent the address of micro instructions in said read only memory, which is determined by contents of said check register upon occurrence of an error operation.

6. An apparatus in accordance with claim 5, further including an address evacuation register connected to said address control circuit for evacuating an address signal generated by said address control circuit and transferring said signal, representative of an address in said memory, to said address control circuit upon reexecution.

7. A data-processing apparatus comprising:

a series of sequentially controlled processing stages;

an addressable memory for storing instructions including information processed in said processing stages and a check field containing information representing whether an instruction should be reexecuted;

a series of processing circuits connected to said memory for executing said instructions in accordance with the contents of said memory, said processing stages including means for detecting an error operation occuring during the execution of said instructions and for producing an error signal in response thereto;

a check register, responsive to said error signal and connected to said memory for setting therein the contents of said check field, said check register including first means, responsive to a first predetermined condition of said check field, for providing a first signal representative of whether each instruction should be reexecuted, second means responsive to a second predetermined condition of said check field, for providing s second signal representative of whether each processing stage should be reexecuted, and third means, responsive to a third predetermined condition of said check field, for providing a third signal representative of whether reexecution of said instructions is impossible; and an address control circuit, connected to said check register and said error operation detecting means and responsive to the outputs thereof, for providing a signal representative of the address of data in said memory corresponding to a particular processing stage for supplying said address location to said memory.

8. An apparatus in accordance with claim 7, wherein said check register comprises:

first, second and third flip-flops successively set by the contents of said check field and reset at the last processing stage of one instruction executing sequence, the said outputs of said first and third flip-flops, representing that reexecution is impossible and that reexecution is being effected, respectively;

a fourth flip-flop adapted to be set by the contents of said check field during every processing stages and to be reset at the termination of the respective processing stages;

a first transfer means for transferring the set output of said first flip-flop to said address control circuit;

a first AND gate responsive to the reset outputs of said first and fourth flip-flops for providing a signal representing the reexecution command for each instruction;

second transfer means for transferring the output of said first AND gate to said address control circuit;

a second AND gate responsive to the reset output of said first flip-flop and the set output of said fourth flip-flop for providing a signal representative of the reexecution of each processing stage;

third transfer means for transferring the output of said second AND gate to said address control circuit; and fourth transfer means for transferring the set output of said third flip-flop to said address control circuit.

* * * * *